Nov. 11, 1930.  W. M. ZAIKOWSKY  1,781,146
INTERNAL COMBUSTION ENGINE
Filed Oct. 23, 1925
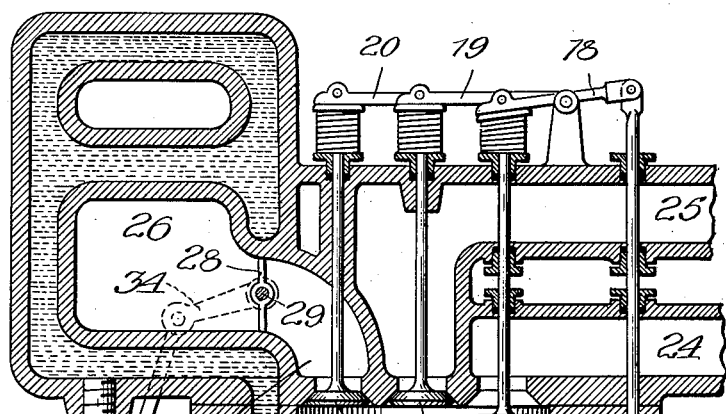
Fig.1.
Fig.2.
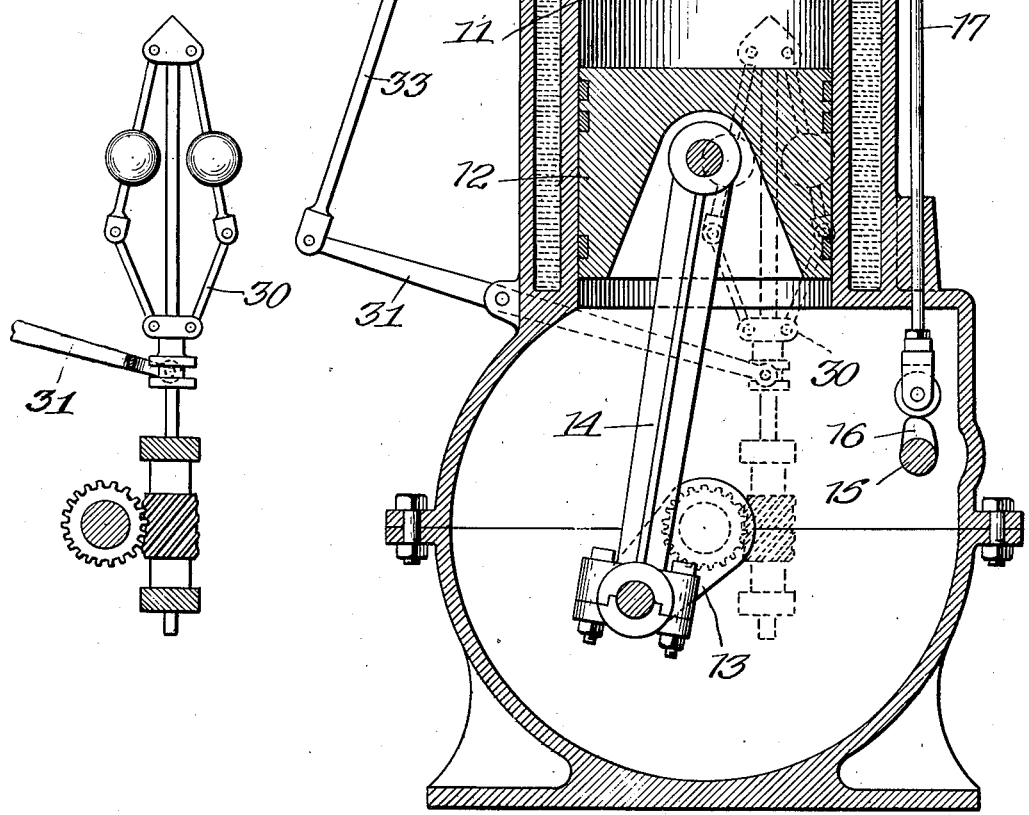
Inventor:
Wladimir M. Zaikowsky,
By Dyrenforth, Lee, Chritton and Wiles,
Attys.

Patented Nov. 11, 1930

1,781,146

UNITED STATES PATENT OFFICE

WLADIMIR M. ZAIKOWSKY, OF PASADENA, CALIFORNIA, ASSIGNOR TO STANDARD OIL DEVELOPMENT COMPANY, A CORPORATION OF DELAWARE

INTERNAL-COMBUSTION ENGINE

Application filed October 23, 1925. Serial No. 64,354.

This invention relates to internal combustion engines and will be understood from the following specification and shown in the accompanying drawings, in which:

Figure 1 is a vertical longitudinal section through an engine embodying the invention; and Fig. 2 is a detail of the governor construction.

This is an improvement on my application for internal combustion engine, Serial No. 714,263, filed May 19, 1924.

The embodiment illustrated comprises an engine having a crank case 10, a cylinder 11 in which is slidable the piston 12 which drives a crank shaft 13 by means of a connecting rod 14. A cam shaft 15 is driven at one half the speed of the crank shaft 13 by means of gears, not shown.

The cam shaft 15 has a series of cams 16 of which only one is shown, each of which operates a lift rod 17. Each lift rod is pivotally connected to one of the rocker arms 18, 19 or 20 which in turn operate the exhaust valve 21, the inlet valve 22 and the compression chamber valve 23, respectively. The valves 21 and 22 control communication between the exhaust and inlet passages 24 and 25, respectively, the latter leading to a carbureter or other means of mixing a fluid fuel with air to form a combustible mixture. With the valve 23 held in a closed position, the engine would operate as an ordinary four-stroke-cycle internal combustion engine.

For efficiency in operation, particularly on automobile engines operated on ordinary gasoline, it is highly desirable that the compression in the cylinder be in the neighborhood of 8 to 1, but due to detonation at high compression it has been found commercially impracticable to use compressions in excess of 4 to 1 or 5 to 1. By using an auxiliary cooling chamber 26 connected to the cylinder 11 by means of a passage 27, the latter being controlled by the valve 23, it is possible to so cool the charge as to enable it to be compressed to a much higher degree with a total absence of detonation.

The inlet and exhaust valves 22 and 21 may perform their function as in any other four-stroke-cycle internal combustion engine. Assuming now that the engine has been standing idle for sometime so that the pressure within the chamber 26 is substantially that of the atmosphere, the operation of the engine is as follows: The engine having drawn in a combustible charge through the inlet passage 25 on the suction stroke, the piston starts up on the compression stroke. During this stroke and ordinarily before the middle of the stroke the compression chamber valve 23 opens and remains open until shortly before ignition takes place, (the spark plug or other ignition device not being shown). During the time the valve 23 remains open, the piston is driven upward and consequently compresses a part of the combustible charge in the cylinder 11 into the compression chamber 26. The valve 23 closes and the charge in the cylinder then burns and, on the exhaust stroke, is forced out through the exhaust passage 24 in the usual way.

During the time the charge compressed in the chamber 26 remains therein it undergoes cooling with reduction of pressure but not of density, and on the next compression stroke, when the valve 23 is again opened, some of the compressed and cooled charge in the chamber 26 rushes into the cylinder 11 raising the pressure therein. As the pressure in the cylinder and chamber become equalized and, as the piston 12 continues to ascend, some of the charge in the cylinder is again forced into chamber 26. After a few revolutions the pressure in the chamber 26 is raised by joint operation of the piston in the cylinder and chamber valve to a point where the chamber is giving back to the cylinder on each compression stroke as much compressed charge as it receives from the cylinder. It will be noted that the chamber 26 is water cooled so that the charge returned to the cylinder is cooler than that which the chamber receives from the cylinder. The effect of this is to reduce the temperature of the charge in the cylinder at the time of closing the valve 23, over that which would be obtained therein were the chamber 26 absent altogether.

It should be understood that while, for ordinary purposes, ignition is regarded as instantaneous, there may be, and in the case of high speed engines, there is often a measurable time interval after ignition has been initiated before it has proceeded to any substantial extent, so that there could be no possibility of spread of the flame into the compression chamber. In such cases, complete closing of the valve 23 may lap the ignition timing, altho, in any event, it is essential that the lap be too small to permit of the possibility of ignition of that portion of the charge adjacent the valve 23.

If desired, the time of closing of the valve 23 can be delayed until after the piston has passed top dead center, it being understood that ignition then takes place correspondingly later. In such case the cylinder may have very little clearance, substantially complete displacement of exhaust gases resulting, and the expansion ratio on the working stroke being fixed in the time of closing of the valve 23.

With this arrangement it is possible to increase the compression ratio to 8 to 1 or even more and still keep the temperature of the charge at the time of firing so low as to prevent any detonation whatever.

In order to control the rate of flow of the charge between the cylinder and the chamber during the period of opening the valve 23, I have provided a butterfly valve 28 which is mounted in the passage 27 upon a shaft 29. This is controlled by a governor 30 which operates through a lever 31 fulcrumed at 32 and is connected to the shaft and butterfly valve through a link 33 and lever 34. At slow speeds the butterfly valve 28 is partly closed thereby lowering the rate of exchange of gas between the cylinder 11 and chamber 26 when the valve 23 is open. At higher speeds however, the butterfly valve 23 will be opened farther and consequently the charge in the compression chamber 26 will pass more rapidly into the cylinder 11, or in the reverse direction.

The valve 28, operated by the governor 30, therefor constitutes a means by which the rate of flow of gases between the cylinder and compression chamber may be controlled in accordance with the speed of the engine, to the end that the operating cycle of the engine may be at all times as efficient as possible. Ordinarily, such control will be exercised as described, to reduce the rate of exchange of gases at low speeds and increase it at high speeds, but the desired end of maintaining maximum efficiency of the cycle may require wide variations in this respect, dependent upon the characteristics of the engine and the nature of its service.

It should be understood that the desired control by the governor may be effective directly upon the valve 23 instead of upon the additional valve 28, the latter construction being preferred however.

While I have shown and described but a single embodiment of this invention, it is to be understood that it is capable of many modifications. Changes, therefore, in the construction and arrangement may be made which do not depart from the spirit and scope of the invention as disclosed in the appended claims.

What I regard as new, and desire to secure by Letters Patent, is:

1. The combination with an internal combustion engine of the four-stroke cycle type having a cylinder and piston for compressing a combustible charge, of a compression chamber of constant volume connecting only with the cylinder above the piston, a valve controlling said connection, means for cooling the gaseous contents of said compression chamber, means for opening the said valve during the compression stroke of the engine and for closing the said valve before ignition can spread into the compression chamber, and a governor-controlled auxiliary valve controlling the connection between the compression chamber and the cylinder.

2. In an internal combustion engine of the type in which each compression stroke immediately precedes an explosion stroke, a cylinder, a piston operable therein, a compression chamber adjacent said cylinder and connected thereto, means for passing a part of the charge in the cylinder into said chamber in the same manner during each compression stroke of the piston and for returning part of the charge in the compression chamber to the cylinder during the next compression stroke, and a governor-controlled auxiliary valve controlling the connection between the compression chamber and the cylinder.

3. An internal combustion engine of the type in which each compression stroke immediately precedes an explosion stroke, having a cylinder and a piston for compressing a combustible mixture and having a compression ratio greater than three-to-one, a compression chamber communicating only with the cylinder of the said engine above the piston and having a volume relatively large as compared with the clearance volume of the cylinder, means for cooling the said compression chamber, means operating in the same manner during each compression stroke for opening communication between the compression chamber and the cylinder during the first half of the stroke and closing said communication before ignition can spread into the compression chamber, and a governor-controlled auxiliary valve controlling the connection between the compression chamber and the cylinder.

4. In an internal combustion engine of the type in which each compression stroke immediately precedes an explosion stroke; a cylinder; a piston operable therein; a compression chamber adjacent said cylinder and connected thereto; means for passing a part of the charge in the cylinder into said chamber in the same manner during each compression stroke of the piston and for returning part of the charge in the compression chamber to the cylinder during the next compression stroke; means for cooling the contents of the compression chamber; and a governor-controlled auxiliary valve controlling the connection between the compression chamber and the cylinder.

In testimony whereof I have hereunto set my hand this 14th day of October, 1925.

WLADIMIR M. ZAIKOWSKY.